(12) United States Patent
Smith et al.

(10) Patent No.: US 7,871,964 B2
(45) Date of Patent: Jan. 18, 2011

(54) COMPOSITIONS AND METHODS FOR MITIGATING OR PREVENTING EMULSION FORMATION IN HYDROCARBON BODIES

(75) Inventors: James Smith, Bentley (AU); Chandrashekhar Y. Khandekar, Bentley (AU); Rohan Wilson, Bentley (AU)

(73) Assignees: M-I Australia Pty. Ltd., Perth (AU); M-I SWACO Norge AS, Stavanger (NO)

( * ) Notice: Subject to any disclaimer, the term of this patent is extended or adjusted under 35 U.S.C. 154(b) by 149 days.

(21) Appl. No.: 12/178,481

(22) Filed: Jul. 23, 2008

(65) Prior Publication Data
US 2010/0022420 A1  Jan. 28, 2010

(51) Int. Cl.
C09K 8/536 (2006.01)
C09K 8/584 (2006.01)
E21B 37/06 (2006.01)
B01D 17/04 (2006.01)

(52) U.S. Cl. .......... 507/239; 166/305.1; 507/240; 507/246; 507/259; 507/266; 516/191

(58) Field of Classification Search .......... 507/239, 507/240, 246, 259, 266; 516/191
See application file for complete search history.

(56) References Cited

U.S. PATENT DOCUMENTS

| | | | | |
|---|---|---|---|---|
| 4,270,989 | A | * | 6/1981 | Eckles et al. .......... 205/281 |
| 5,851,961 | A | * | 12/1998 | Magyar .......... 507/119 |
| 2005/0282711 | A1 | | 12/2005 | Ubbels et al. |
| 2005/0282915 | A1 | | 12/2005 | Ubbels |
| 2006/0079427 | A1 | * | 4/2006 | Burt et al. .......... 510/295 |
| 2009/0036329 | A1 | | 2/2009 | Debord et al. |

* cited by examiner

Primary Examiner—Timothy J. Kugel
(74) Attorney, Agent, or Firm—M-I L.L.C.

(57) ABSTRACT

A composition for mitigating or preventing the formation of an emulsion between naphthenic acid and metal cations in a hydrocarbon body, the composition including at least one alkoxylated amine and at least one acid and/or alcohol is disclosed.

21 Claims, 10 Drawing Sheets

COMPOSITIONS AND METHODS FOR MITIGATING OR PREVENTING EMULSION FORMATION IN HYDROCARBON BODIES

FIELD OF THE INVENTION

The present invention relates broadly to the mitigation of emulsions, particularly sodium carboxylate emulsions, in hydrocarbon bodies. In particular, the invention relates to compositions useful for mitigating emulsions such as sodium carboxylate emulsions in hydrocarbon reservoirs, such as crude oil reservoirs. The invention further relates to methods of mitigating such emulsions utilising the compositions of the invention. The invention also relates to methods and compositions for completion of oil wells.

BACKGROUND TO THE INVENTION

The formation of precipitates or emulsions in crude oil during extraction and refinement may present problems, such as the slowing or complete cessation of oil flow. Removal of these precipitates is often difficult, expensive and hazardous to human health. The formation of stabilized emulsions delays the production of oil for future sale and use, and also has a deleterious effect on the quality of the oil. Overall, the formation of precipitates and emulsions in crude oil decreases the efficiency of extraction and refinement processes.

The formation of precipitates or emulsions in crude oil generally results from the reaction of metal cations with indigenous naphthenic acids. In this context, naphthenic acids are generally considered to be complex mixtures of alkyl-substituted acyclic and cyclic carboxylic acids that are generated from in-reservoir biodegradation of petroleum hydrocarbons. They are normal constituents of nearly all crude oils and are typically present in amounts of up to 4% by weight. They are predominantly found in immature heavy crudes, whereas paraffinic crudes normally have lower naphthenic acid contents. Metal cations found in crude oil that are involved in precipitate and emulsion formation include alkali and alkali-earth metals such as sodium, potassium, calcium and magnesium. Transition metals such as iron may also be involved.

There are two common types of precipitate/emulsion that are formed as a result of the reaction between metal ions and naphthenic acids in crude oil:

(1) Calcium Naphthenates

These are generated from heavy crude oils with high levels of carboxylic acids and are formed as a result of a reaction between a naphthenic acid and a calcium cation. The properties of calcium naphthenates pose unique challenges in terms of flow assurance such as:

- plugging of chokes, valves, pumps and vessel internals;
- blocking of water legs in separators due to migration into the water phase;
- unplanned shutdowns due to hardened deposits causing blockages;
- disposal issues due to presence of heavy metals which can lead to high NORM activity;
- negative impact on water quality due to an increased oil content in the separated water; and
- negative impact on injection/disposal well performance.

(2) Sodium Carboxylates

These are generated by the reaction of monocarboxylic acids in crude oil and sodium ions in the water phase and are often referred to as carboxylate soaps. They produce flow assurance challenges that are different to calcium naphthenates, in particular:

- they form ultra stable viscous emulsions which accumulate at the interface of the oil and water components in a separator thereby reducing the residence time and efficiency of separation;
- sludges of carboxylate soaps can reduce storage and export tank capacity making it difficult for removal from the tanks;
- toxic sludges may be produced; and
- oil-wet soap particles may be discharged in the separated water.

It is recognised that naphthenic acid salts, commonly referred to as "soaps" in the oil industry, are present in a variety of hydrocarbon sources. The issue is predicated by high Total Acid Number (TAN), indicating significant amounts of naphthenic acid specified by the general formula R—COOH, but more specifically described in the literature as carboxylic acids of cyclic and acyclic types as noted above. The naphthenic acids may be further subdivided between naphthenic acids causing calcium naphthenate solids and sodium carboxylate solids.

When exposed to precise conditions, naphthenic acids partition from the oil phase to the aqueous phase. The main factors believed to play a role in "soap" formation can be divided into production chemistry issues of crude oil composition, production water and pH variations and physical parameters such as pressure, temperature, co-mingling of fluids, shear, and water-cut. The partitioning of naphthenic acids under precise conditions may lead to production problems, including solids formation and emulsification, at the reservoir wellbore interface and throughout the surface facilities, such as pipelines and separators (i.e. as listed above).

Once such particulate matter is formed in porous media, formation damage may occur through change in wettability and permeability impairment by various mechanisms. Particularly, a tight emulsion incorporating solids as discussed above may be formed and move along the interface during fluid flow in the reservoir porous medium and may be captured at the pore throats where the flow area is constricted and wettability shift may occur. The formation of sodium carboxylate soaps and their subsequent precipitation in the porous medium may cause major formation damage problems in the production of naphthenic acid containing crude oils.

Sodium carboxylate "soaps" are formed by contact of acidic crude oil with high pH brine or similar aqueous media. Sources of water effective in naphthenate soap formation include the connate water present in the reservoir, water injected for secondary recovery purposes, filtrate of water based mud invading the near-wellbore formation and completion fluids invading the near-wellbore formation, or the water entrained as a result of the water conning phenomenon. The prompting process for the formation of sodium carboxylate soap is the contact of acidic crude and fluid are described in the following.

With regard to the reaction chemistry within the system, the formation water is usually saturated with $CO_2$ establishing an equilibrium under the reservoir pressure, temperature, and brine pH conditions. Carbon dioxide ($CO_2$) contained in formation fluids in the reservoir controls the system pH. $CO_2$ dissociates to bicarbonate and further into carbonic acid during production transmittal. As a result of pressure decreases, the pH of the water increases allowing the carboxylic acids in the crude oil to partition to some degree into the water phase where they may react with sodium cations to form soap. The change in pH is deemed a function of pressure decrease related to $CO_2$ content in the crude oil.

Hence, the $H^+$ concentration decreases and equilibrium shifts as the pressure drop triggers the degassing of $CO_2$ during the flow of fluids under a pressure gradient, for example lifting from a high pressure well bore to a low pressured process facility. This reduction in the protons yields excess $OH^-$ and increases the pH in the water.

In the case of drilling fluid filtrate and completion fluid introduction, the connate water pH is increased by the introduction of highly buffered high pH fluids meant to prevent swelling of resident clays in the near wellbore-reservoir interface. This direct introduction leads to immediate excess $OH^-$ and increases the pH.

SUMMARY OF THE INVENTION

In one aspect, embodiments disclosed herein relate to a composition for mitigating or preventing the formation of an emulsion between naphthenic acid and metal cations in a hydrocarbon body, the composition including at least one alkoxylated amine and at least one acid and/or alcohol.

In another aspect, embodiments disclosed herein relate to a method for mitigating or preventing the formation of an emulsion between naphthenic acid and metal cations in a hydrocarbon body, wherein the method comprises contacting a composition comprising at least one alkoxylated amine with the hydrocarbon body.

In yet another aspect, embodiments disclosed herein relate to a method of completing an oil well, wherein the method comprises pumping a completion fluid into the oil well, wherein the completion fluid comprises water, at least one alkoxylated amine, and at least one acid and/or alcohol.

Other aspects and advantages of the invention will be apparent from the following description and the appended claims.

DETAILED DESCRIPTION

Figure 1:
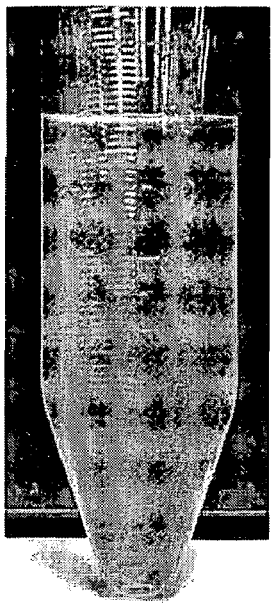
FIG. 1 is a photograph of a mixture of calcium chloride, klagard and a composition (Formulation A) of the invention.

As already noted, in the context of hydrocarbon bodies, such as crude oil reservoirs, "naphthenic acid" includes a complex mixture of carboxylic acids. Consequently, the term should be read as such in this specification and should not be construed as particularly limited. The naphthenic acid may be present in its acidic neutral form or may be dissociated into naphthenate anions. Generally, the naphthenic acid is dissociated into naphthenate anions.

The metal cation taking part in the emulsion is generally an alkali metal or an alkaline earth metal. More particularly, the metal cation will generally be a sodium, potassium, calcium or magnesium cation.

The emulsion predominantly contains sodium carboxylate species formed from naphthenic acid, which may be in the form of naphthenate anions as discussed above, and sodium cations.

The alkoxylated amine utilised in the composition is preferably a tertiary or quaternary alkyl-substituted amine wherein the alkyl groups have been further substituted with one or more alkoxyl groups. Optionally, the alkyl groups may also be substituted with one or more tertiary amino groups which may also be substituted with alkoxyl groups. Preferred alkoxyl groups of the invention include methoxyl, ethoxyl and propoxyl groups. In addition, the alkoxyl groups may also be substituted with one or more hydroxyl groups. Even more preferably, the hydroxyl groups are located at the termini of the alkoxyl groups. Preferred alkoxylated amines for use in the present invention have the following structure:

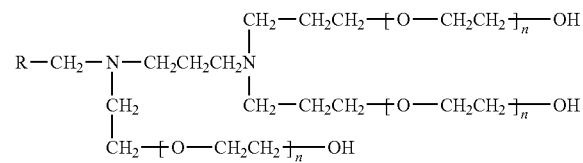

wherein R represents an alkyl chain having between one and ten carbon atoms and n is any integer between 1 and 8. Preferably, n is an integer between 4 and 7.

Other preferred alkoxylated amines for use in the present invention have the following structure:

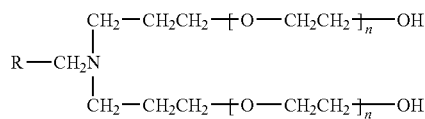

where R represents an alkyl chain having between one and ten carbon atoms and n is any integer between 1 and 8. Preferably, n is an integer between 4 and 7.

Further preferred alkoxylated amines suitable for use in the present invention are those with the following structure:

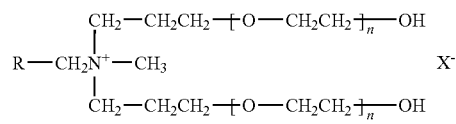

where R represents an alkyl chain having between one and ten carbon atoms, X represents a halogen, nitrate or acetate group and n is any integer between 1 and 8. More preferably, n is an integer between 4 and 7.

Additional examples of alkoxylated amines suitable for use in the present invention include alkyldiamine ethoxylates, tallowalkylamine ethoxylate propoxylates. Other examples include mixtures of alkoxylated fatty amines with carbon chain length from $C_{10}$-$C_{24}$, preferably $C_{14}$-$C_{18}$ and fatty amines with carbon chain length between $C_{12}$-$C_{24}$, preferably $C_{14}$-$C_{18}$ (e.g. Armorhib-28 by Akzo Nobel).

Other examples of alkoxylated amines suitable for use in the present invention include quaternary amines of the type:

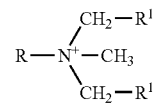

where $R^1$ is $(CH_2CH_2O)_nH$ and R is a saturated or unsaturated alkyl chain with carbon numbers varying from $C_{10}$-$C_{16}$, more preferably from $C_{10}$-$C_{13}$, and having an average number of ethoxylate units of from 10 to 20, more particularly from 3-18 (e.g. Armohib-31 by Akzo Nobel).

The compositions of the invention may contain one or more alkoxylated amine. Preferably, the compositions contain two alkoxylated amines. The composition generally contains up to 5% w/w of the alkoxylated amines, more preferably about 2.5 to 5% w/w.

Other components of the composition may include alcohols and organic and inorganic acids. Preferred alcohols include methanol, ethanol, propanol, isopropanol, butanol and substituted alcohols such as 2-butoxyethanol. The most preferred alcohols are isopropanol and 2-butoxyethanol. Suitable acids include sulphuric acid, hydrochloric acid, phosphoric acid, glacial acetic acid, propanoic acid, benzoic acid, benzene sulphonic acid, dodecyl benzene sulphonic acid and isopropylamine dodecyl benzene sulphonic acid. Most preferably, phosphoric acid, dodecyl benzene sulphonic acid and isopropylamine dodecyl benzene sulphonic acid are utilised.

The composition may contain more than one alcohol and/or more than one acid. Preferably, the composition contains an acid and an alcohol. Even more preferably, the composition contains two or more acids and at least one alcohol. The compositions generally contain between about 10 and 60% of the alcohol components and about 30 to 80% of the acid components.

The composition may also include further additives, particularly demulsifiers. For example, the composition may also include an alkylene oxide block polymer demulsifier with a relative solubility in the range of from 5 to 7, such as Majorchem DP-314, an alkyl phenol/formaldehyde resin ethoxylate demulsifier with a relative solubility in the range of from 7 to 9, such as Majorchem DP-282, and/or a mixture of triol ester and tetrol demulsifier with a relative solubility in the range of from 5 to 7, such as Basreol P DB-2289.

While not wanting to be bound by any theory as to why the compositions of the invention are effective, it is believed the alkoxylated amines in the compositions exhibit surface-active properties that cause the alkoxylated amine to align and combine with free sodium carboxylate in a layer at the oil-water interface and thereby prevent interactions between organic acids in the oil phase with cations or cation complexes in the water phase.

In another aspect of the invention there is provided a method for mitigating or preventing the formation of an emulsion between naphthenic acid and metal cations in a hydrocarbon body including contacting a composition including at least one alkoxylated amine with the hydrocarbon body.

The composition may be contacted with the hydrocarbon body at any suitable time. In some embodiments, the composition is contacted with the hydrocarbon body simultaneously with or after deprotonation of the naphthenic acid. In particular embodiments the composition is contacted with the hydrocarbon body at a time suitable to mitigate or prevent a wettability shift in the hydrocarbon body. This advantageously prevents precipitation of species, for example in the porous media in the near well-bore reservoir, which may cause major formation damage and consequential processing problems.

In one embodiment, the composition is introduced directly into the hydrocarbon body as discussed above. For example, the composition may be introduced directly into a near well-bore reservoir where it contacts crude oil in the reservoir. In certain embodiments the composition is dissolved in an aqueous solution for use in a topside de-salting or washing step of the crude oil prior to further refinement. In these embodiments, the aqueous solution preferably contains one or more species such as NaCl, KCl, $NaHCO_3$, $KHCO_3$, $Na_2CO_3$, $K_2CO_3$, $CaCl_2$, $CaBr_2$, Klagard™ clay stabiliser, NaOH and liquid polyamines such as Ultrahib™.

The composition may also be introduced into the crude oil before or after a precipitate or an emulsion has formed. In addition, two or more compositions can be used simultaneously to mitigate a precipitate or emulsion in a sample of crude oil. The amount of composition (or compositions if more than one) added to the crude oil is generally between 1 and 1000 ppm, more preferably between 250 and 700 ppm and even more preferably between 400 and 600 ppm.

The rate of separation of aqueous and oil phases is greatly enhanced by the compositions of the invention relative to untreated oil samples. Complete separation generally occurs within 40 minutes of adding a composition to an emulsion. Often however, separation is observed within a much smaller time frame of 5 to 10 minutes.

Contact of the composition with the hydrocarbon body may be performed at any suitable temperature. Preferably, the composition is contacted with the hydrocarbon body at a temperature of from about 40 to 85° C., and more preferably at about 65° C.

Again, as will be understood in the art, the naphthenic acid includes a mixture of carboxylic acids which may be present in their acidic neutral form or may be dissociated into naphthenate anions.

The metal cation is generally an alkali metal or an alkaline earth metal. More particularly, the metal cation is generally a sodium, potassium, calcium or magnesium cation.

The emulsion may be a sodium carboxylate emulsion or a mixture of such emulsions. This will be appreciated by the description provided above. In certain embodiments, the emulsion that is prevented or mitigated is a sodium carboxylate emulsion that predominantly contains sodium carboxylate species formed from a naphthenic acid and/or naphthenate anions and sodium cations.

The composition utilised in the method may contain any of the alkoxylated amines disclosed above. Optionally, the composition for use in the method of the invention may contain at least one acid and/or alcohol in accordance with the composition described above. Examples of suitable acids include sulphuric acid, hydrochloric acid, phosphoric acid, glacial acetic acid, propanoic acid, benzoic acid, benzene sulphonic acid, dodecyl benzene sulphonic acid and isopropylamine dodecyl benzene sulphonic acid. Preferred alcohols include methanol, ethanol, propanol, isopropanol, butanol and substituted alcohols such as 2-butoxyethanol.

Likewise, the composition used in accordance with the above described method may also include demulsifiers as described above.

In yet another aspect of the invention there is provided a completion fluid for an oil well, the completion fluid including at least one alkoxylated amine and at least one acid and/or alcohol.

The completion fluid may contain any of the alkoxylated amines, acids, alcohols and/or additional demulsifiers described above. It will be appreciated that that the quantities of the alkoxylated amine, acid, alcohol and/or demulsifiers in the completion fluid will depend on the particular oil well to be completed. Alternatively, the completion fluid may contain at least one of the compositions described above. In any case, the completion fluid may also contain water.

During the completion stage of an oil well, the completion fluid may be introduced directly into the well. Alternatively, the completion fluid is dissolved in an aqueous solution (unless the fluid already contains sufficient water) prior to introducing the solution into the oil well.

Following from the above, according to yet another aspect of the invention there is provided a method for completion of an oil well including pumping a completion fluid as described above into the oil well.

Embodiments of the invention will now be discussed in more detail with reference to the following examples which are provided for exemplification only and which should not be considered limiting on the scope of the invention in any way.

EXAMPLES

TABLE 1

Compositions of the invention including their % constituents.

| Constituent | Amount | Formulations |
|---|---|---|
| Armohib ™ 28 | 2.0-2.5 | A, B, C |
| Armohib ™ 31 | 1.5-2.5 | A, B, C, D |
| 2-Butoxyethanol | 45 | A |
| Dodecyl benzene sulphonic acid | 5 | D |
| Glacial acetic acid | 42-50 | A, D |
| Isopropanol | 20-42 | B, C, D |
| Isopropyl amine dodecyl benzene sulphonic acid | 3 | A, C |

TABLE 1-continued

Compositions of the invention including their % constituents.

| Constituent | Amount | Formulations |
|---|---|---|
| Additional Demulsifier | 5-15 | A, C, D |
| Phosphoric acid | 45-75 | B, C |

An additional formulation was also prepared and is referred to below as Formulation E. This is a composition including a blended oxyalkylated phenolic resin and glycol ester supplied by TOHO Chemical Industry Co., Ltd. as Demulfer D989 as an active constituent.

Example 1

The effectiveness of Formulation A on $CaCl_2$ brine in the presence of klagard clay stabiliser to be used in the completion fluid for oil obtained from a field off the North West coast of Malaysia was evaluated.

To a 11.0 lb/gal calcium chloride solution was added 1% (v/v) Formulation A. To this solution 8.0 lb/bbl (wt/vol) klagard solution was added. The appearance of the solution is shown in FIG. 1.

Figure 2:
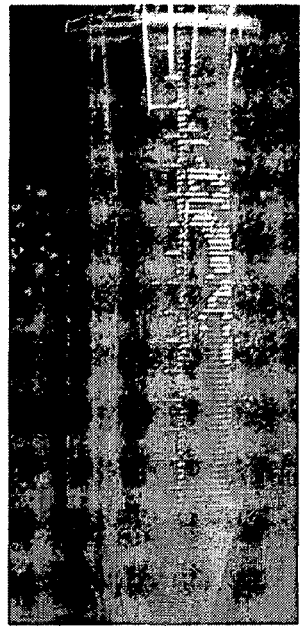
FIG. 2 is a photograph of the emulsion obtained from stirring the mixture of FIG. 1 with crude oil from a field off the North West coast of Malaysia.

Next, a 50:50 mixture of the $CaCl_2$ brine and crude oil was stirred at 10,000 rpm for one minute to create an emulsion as shown in FIG. 2. The resultant emulsion was then heated in a water bath maintained at 65° C. and the water separation was monitored in five minute increments.

Figure 3:
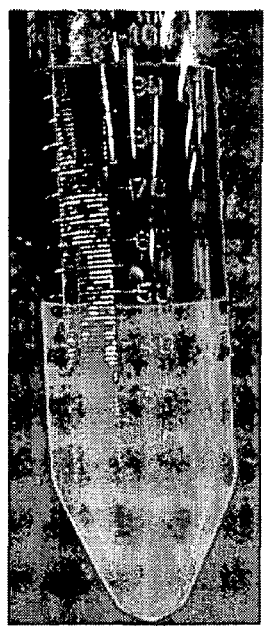
FIG. 3 is a photograph showing complete separation of the emulsion in FIG. 2 after seven minutes.

Complete separation of the water phase was observed after seven minutes (FIG. 3). The interface was found to be clean. No precipitation or sedimentation was observed. This example demonstrates (i) that klagard is compatible with 11.0 lb/gal calcium chloride brine and Formulation A (no precipitation or separation) and (ii) demulsification was complete within 7 minutes. A clean interface without any sediment at the bottom was achieved.

Example 2

The effectiveness of emulsion preventive Formulation A in a completion fluid containing $CaCl_2$ brine with 50% sodium hydroxide as a neutralising agent and ultrahib was evaluated on oil obtained from a development field off the North West coast of Malaysia.

To a 11.0 lb/gal calcium chloride solution was added 1% (v/v) Formulation A. 50% sodium hydroxide solution was added slowly to raise the pH from 1.59 to 6.2. This also resulted in the precipitation of calcium hydroxide. To this liquid was added 1% Formulation A and the pH noted again. Finally, 2% (v/v) ultrahib was added to this solution and the pH was noted. This also caused formation of an orange coloured liquid.

Figure 4:
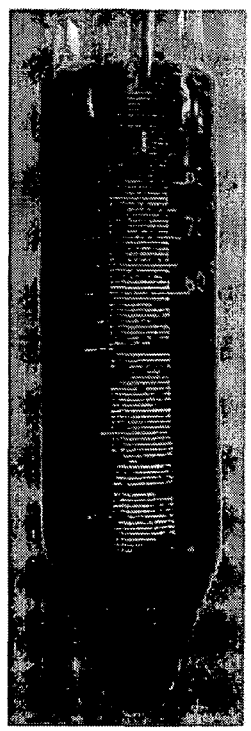
FIG. 4 is a photograph of an emulsion obtained by stirring a mixture of calcium chloride, sodium hydroxide, ultrahib and a composition (Formulation A) of the invention with crude oil from a field off the North West coast of Malaysia.

Next, a 50:50 mixture of the $CaCl_2$ brine and crude oil was stirred at 10000 rpm at room temperature for one minute to create the emulsion shown in FIG. 4. The resultant emulsion was then heated in a water bath maintained at 65° C. and the separation of water from the oil was monitored every five minutes.

Figure 5:
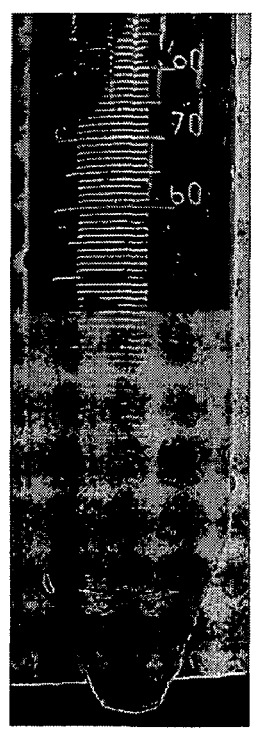
FIG. 5 is a photograph showing separation of the emulsion in FIG. 4 after five minutes at 65° C.
Figure 6:
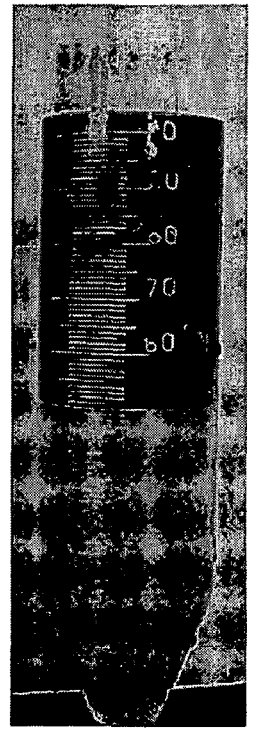
FIG. 6 is a photograph showing separation of the emulsion in FIG. 4 after twenty minutes at 65° C.

Significant separation of the water phase from the oil phase was observed after five minutes as shown in FIG. 5. After twenty minutes the separation was deemed to be complete (see FIG. 6).

This example demonstrates that the composition Formulation A completely separates the emulsion at 65° C. in twenty minutes in the presence of ultrahib and sodium hydroxide.

Example 3

Two oil samples (hereinafter referred to as 'sample A' and 'sample B') collected approximately one hour apart from an oil field off the North West coast of Australia with known emulsion problems were obtained for testing the compositions of the invention.

Synthetic water was blended for use in example 3 based on a water analysis previously provided for scale modelling work. The contents of the blended water are shown in Table 2.

TABLE 2

Components of the synthetic water together with their concentration.

| Salt | Concentration (mg/L) |
|---|---|
| Chloride | 13026.00 |
| Sulphate | 179.75 |
| Barium | 5.73 |
| Calcium | 309.00 |
| Strontium | 14.75 |
| Magnesium | 86.00 |
| Sodium | 8550.30 |
| Potassium | 414.50 |
| Bicarbonate | 930.00 |
| Acetate | 430.00 |

Sample A

The following test procedure was performed on sample A in order to ascertain the effectiveness of compositions Formulation A and Formulation D of the invention.

An emulsion was prepared by mixing 50% of sample A with 50% brine at 9500 rpm for one minute. The resulting emulsion was then decanted in 100 ml increments into seven calibrated centrifuge tubes. The centrifuge tubes were left to stand at 65° C. in a water bath. Either one or both of Formulation A or Formulation D was added to each centrifuge tube in accordance with the quantities in Table 3.

TABLE 3

Quantities of Formulation A and Formulation D added to each centrifuge tube.

| Tube number | FORMULATION A (ppm) | FORMULATION D (ppm) |
|---|---|---|
| 1 | 0 | 0 |
| 2 | 500 | 0 |
| 3 | 1000 | 0 |
| 4 | 0 | 500 |
| 5 | 0 | 1000 |
| 6 | 250 | 250 |
| 7 | 500 | 500 |

Figure 7:
FIG. 7 is a photograph taken after 10 minutes of an untreated emulsion of sample A production fluid with synthetic brine (left) and the same emulsion treated with 500 ppm of a composition (Formulation D) of the invention (right).
Figure 8:
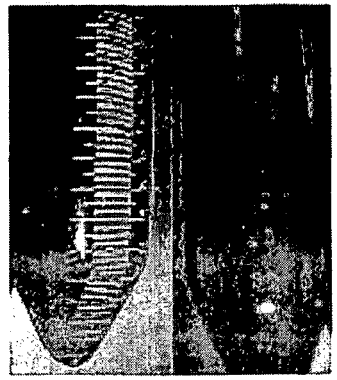
FIG. 8 is a photograph taken after 25 minutes of an untreated emulsion of sample A production fluid with synthetic brine (left) and the same emulsion treated with 500 ppm of a composition (Formulation D) of the invention (right).
Figure 9:
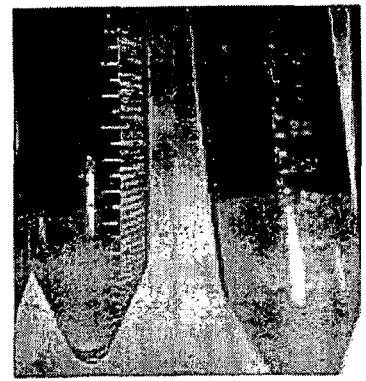
FIG. 9 is a photograph taken after 40 minutes of an untreated emulsion of sample A production fluid with synthetic brine (left) and the same emulsion treated with 500 ppm of a composition (Formulation D) of the invention (right).

The centrifuge tubes were simultaneously shaken 100 times then left to stand at 65° C. in the water bath. Water separation was recorded at intervals of 1, 3, 5, 10, 15, 20, 25, 30 and 40 minutes. The effect of 500 ppm of Formulation D on sample A after 10, 25 and 40 minutes is illustrated in FIGS. 7 to 9. Untreated and treated tubes are shown on the left and right respectively in each figure. The presence of an emulsion can be seen on the untreated samples which are characterised by a light brown "mousse" consistency of the oil. The percentage oil and water separation over 40 minutes is shown in Table 4.

TABLE 4

Percentage oil and water separation in sample A over 40 minutes.

| | | Formulation A | | | | | | |
|---|---|---|---|---|---|---|---|---|
| | | 0 ppm | 500 ppm | 1000 ppm | 0 ppm | 0 ppm | 250 ppm | 500 ppm |
| | | | | | Formulation D | | | |
| | | 0 ppm | 0 ppm | 0 ppm | 500 ppm | 1000 ppm | 250 ppm | 500 ppm |
| Time | | | | | Tube | | | |
| (min) | | 1 | 2 | 3 | 4 | 5 | 6 | 7 |
| 1 | % W | 0 | 2 | 1 | 27 | 2 | 2 | 1 |
| | % E | 100 | 37 | 11 | 12 | 15 | 16 | 33 |
| | % O | 0 | 61 | 88 | 61 | 83 | 82 | 66 |
| 3 | % W | 1 | 10 | 4 | 42 | 38 | 15 | 7 |
| | % E | 99 | 35 | 13 | 0 | 1 | 12 | 29 |
| | % O | 0 | 55 | 83 | 58 | 61 | 73 | 64 |
| 5 | % W | 4 | 22 | 9 | 42 | 38 | 18 | 18 |
| | % E | 96 | 27 | 9 | 0 | 1 | 6 | 5 |
| | % O | 0 | 51 | 82 | 58 | 61 | 76 | 77 |
| 10 | % W | 24 | 44 | 24 | 42 | 39 | 20 | 23 |
| | % E | 76 | 3 | 6 | 0 | 0 | 2 | 0 |
| | % O | 0 | 53 | 70 | 58 | 61 | 78 | 77 |
| 40 | % W | 35 | 46 | 36 | 43 | 39 | 22 | 24 |
| | % E | 65 | 0 | 0 | 0 | 0 | 0 | 0 |
| | % O | 0 | 54 | 64 | 57 | 61 | 78 | 76 |

W = water,
E = emulsion,
O = oil,
ppm = parts per million.

After recording the 40 minute water drop, the separated water was syringed from each tube. The pH of the water was within an acceptable operating range of 6 to 7, thus negating any corrosion risk associated with injection of the acid-based Formulation A and Formulation D compositions.

Figure 13:
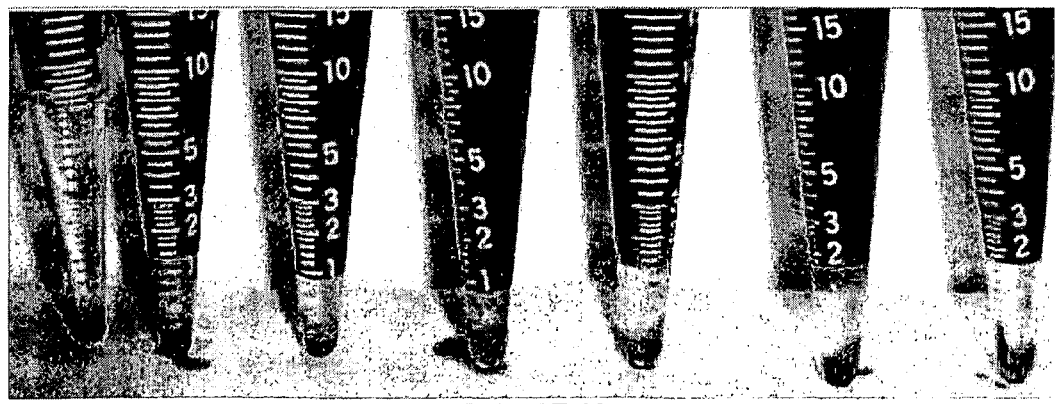
FIG. 13 is a photograph showing residual water and emulsion levels in sample A after grind out treatment in the presence of differing concentrations of two compositions (Formulation A and Formulation D) of the invention.
Figure 14:
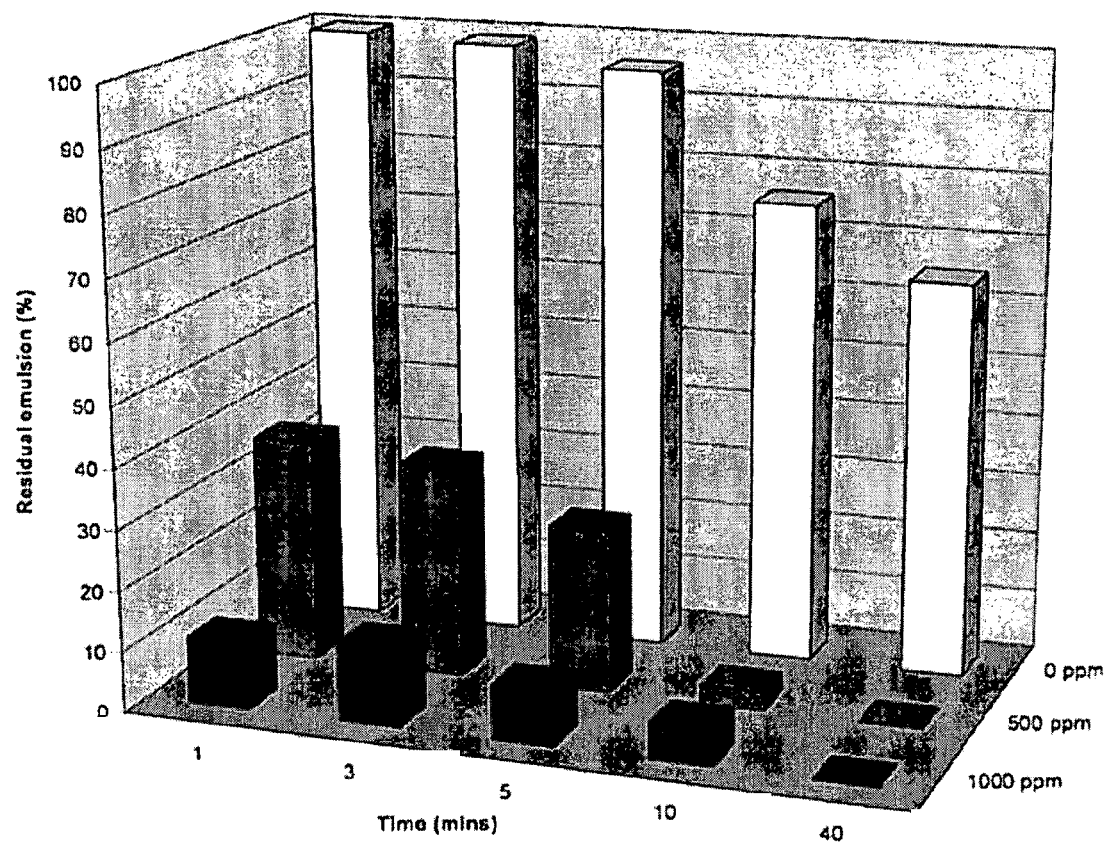
FIG. 14 is a graph of residual emulsion levels in sample A as a function of time and concentration of a composition (Formulation A) of the invention.
Figure 15:
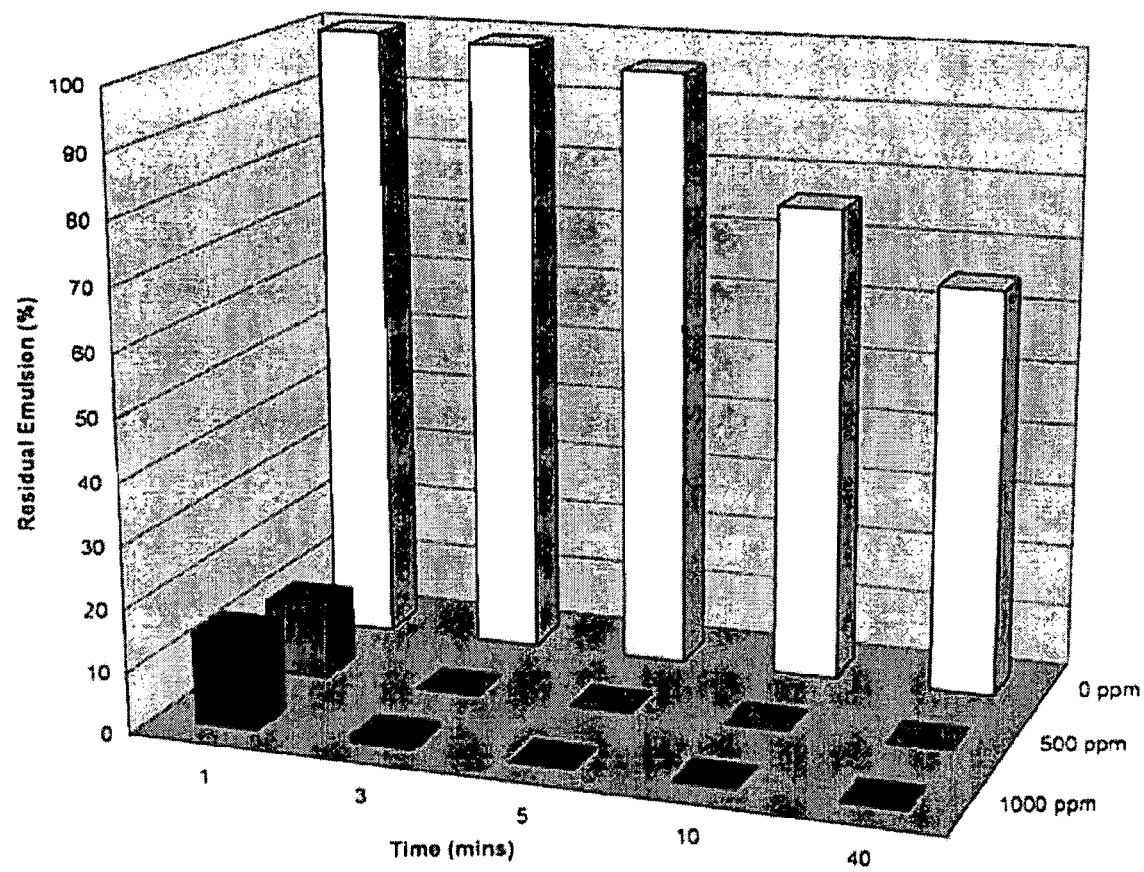
FIG. 15 is a graph of residual emulsion levels in sample A as a function of time and concentration of a composition (Formulation D) of the invention.

A grind out was then performed on the oil remaining in the tubes to determine the amount of residual water or emulsion in the oil. Each tube was vigorously shaken to create a uniform sample. Then 5 ml from each tube was extracted and placed into a 10 ml centrifuge tube containing 5 ml of xylene. The 10 ml centrifuge tubes were shaken vigorously and centrifuged at maximum speed for 15 minutes. The residual water and emulsion were then recorded as a percentage. The results are depicted in FIGS. 14 (for Formulation A) and 15 (for Formulation D) and in Table 5. FIG. 13 shows images of the grind out results for each sample tube.

TABLE 5

Centrifuge grind out results and pH of separated water from sample A:

| | | Tube | | | | | | |
|---|---|---|---|---|---|---|---|---|
| | | 1 | 2 | 3 | 4 | 5 | 6 | 7 |
| pH of separated $H_2O$ | | 7.83 | 7.01 | 6.31 | 6.63 | 5.72 | 6.68 | 6.47 |
| Centrifuge grind out | % W | 15 | 1 | 1.8 | 1.2 | 2.4 | 2 | 3.2 |
| | % E | 2 | 1.4 | 0 | 0.4 | 0.8 | 1.2 | 0 |
| | % O | 83 | 97.6 | 98.2 | 98.4 | 96.8 | 96.8 | 96.8 |

W = water,
E = emulsion,
O = oil,
ppm = parts per million.

The grind out results indicate very little residual emulsion within the oil phase. For example, after 40 minutes, homogenised samples taken from the untreated oil layer still indicate 2% emulsion present, as opposed to 0.4% in the sample treated with 500 ppm of Formulation D. This higher emulsion content in the untreated sample will result in a higher viscosity of the crude oil, potentially causing problems in process vessels and dehydration systems.

Composition Formulation A was less effective than Formulation D at comparative dosage rates, displaying slower water drop as well as being less effective in resolving the emulsion.

Blending the compositions Formulation A and Formulation D in a 1:1 ratio was performed to ascertain if there was any synergy between the two products in treating sample A. Although this blend performed better than Formulation A alone, it was not as effective as Formulation D. Therefore it is concluded that there is no synergy between the two products.

Sample B

Figure 10:
FIG. 10 is a photograph taken after 1 minute of an untreated emulsion of sample B production fluid with synthetic brine (left) and the same emulsion treated with 500 ppm of a composition (Formulation D) of the invention (right).
Figure 11:
FIG. 11 is a photograph taken after 20 minutes of an untreated emulsion of sample B production fluid with synthetic brine (left) and the same emulsion treated with 500 ppm of another preferred composition (Formulation D) of the invention (right).
Figure 12:
FIG. 12 is a photograph taken after 40 minutes of an untreated emulsion of sample B production fluid with synthetic brine (left) and the same emulsion treated with 500 ppm of a composition (Formulation D) of the invention (right).

As Formulation D showed a clear improvement in emulsion resolution over Formulation A in the above experiments on sample A, corresponding experiments on sample B were limited to Formulation D. The same procedure utilised on sample A was performed on sample B. The effect of 500 ppm of Formulation D on sample B after 1, 20 and 40 minutes is illustrated in FIGS. 10 to 12. Untreated and treated tubes are shown on the left and right respectively in each figure. As for sample A, the presence of an emulsion can be seen on the untreated samples which are characterised by a light brown "mousse" consistency of the oil. The emulsion is tighter in sample B relative to sample A as is evident from the poorer water drop in the untreated sample. This was confirmed by the grind out result which showed a higher residual emulsion and water content within the oil phase (see below). The percentage oil and water separation over 40 minutes is shown in Table 6.

TABLE 6

Percentage oil and water separation in sample B over 40 minutes.

| Time (min) | | Formulation D | | | | | | | |
|---|---|---|---|---|---|---|---|---|---|
| | | 0 ppm | 400 ppm | 500 ppm | 600 ppm | 700 ppm | 800 ppm | 900 ppm | 1000 ppm |
| | | | | | Tube | | | | |
| | | 1 | 2 | 3 | 4 | 5 | 6 | 7 | 8 |
| 1 | % W | 0 | 5 | 15 | 3 | 10 | 10 | 3 | 40 |
| | % E | 100 | 0 | 0 | 0 | 0 | 0 | 0 | 0 |
| | % O | 0 | 95 | 85 | 97 | 90 | 90 | 97 | 60 |
| 3 | % W | 0 | 45 | 45 | 49 | 45 | 45 | 35 | 47 |
| | % E | 100 | 0 | 0 | 0 | 0 | 0 | 0 | 0 |
| | % O | 0 | 55 | 55 | 51 | 55 | 55 | 65 | 53 |
| 5 | % W | 0 | 49 | 49 | 49 | 49 | 48 | 48 | 49 |
| | % E | 100 | 0 | 0 | 0 | 0 | 0 | 0 | 0 |
| | % O | 0 | 51 | 51 | 51 | 51 | 52 | 52 | 51 |
| 10 | % W | 1 | 49 | 49 | 49 | 49 | 49 | 48 | 50 |
| | % E | 99 | 0 | 0 | 0 | 0 | 0 | 0 | 0 |
| | % O | 0 | 51 | 51 | 51 | 51 | 51 | 52 | 50 |
| 40 | % W | 12 | 49 | 49 | 49 | 49 | 49 | 48 | 50 |
| | % E | 88 | 0 | 0 | 0 | 0 | 0 | 0 | 0 |
| | % O | 0 | 51 | 51 | 51 | 51 | 51 | 52 | 50 |

W = water,
E = emulsion,
O = oil,
ppm = parts per million.

Figure 16:
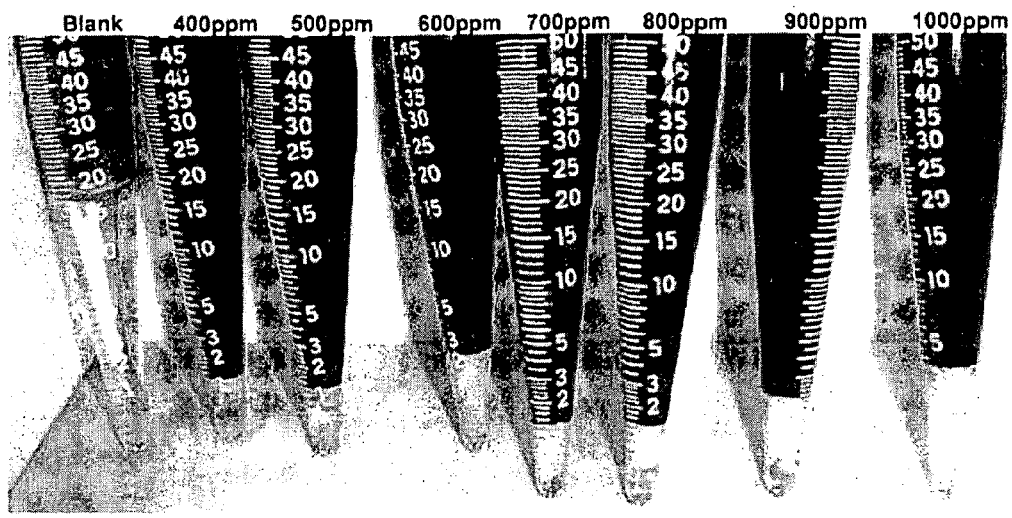
FIG. 16 is a photograph showing residual water and emulsion levels in sample B after grind out treatment in the presence of differing concentrations of a composition (Formulation D) of the invention.
Figure 17:
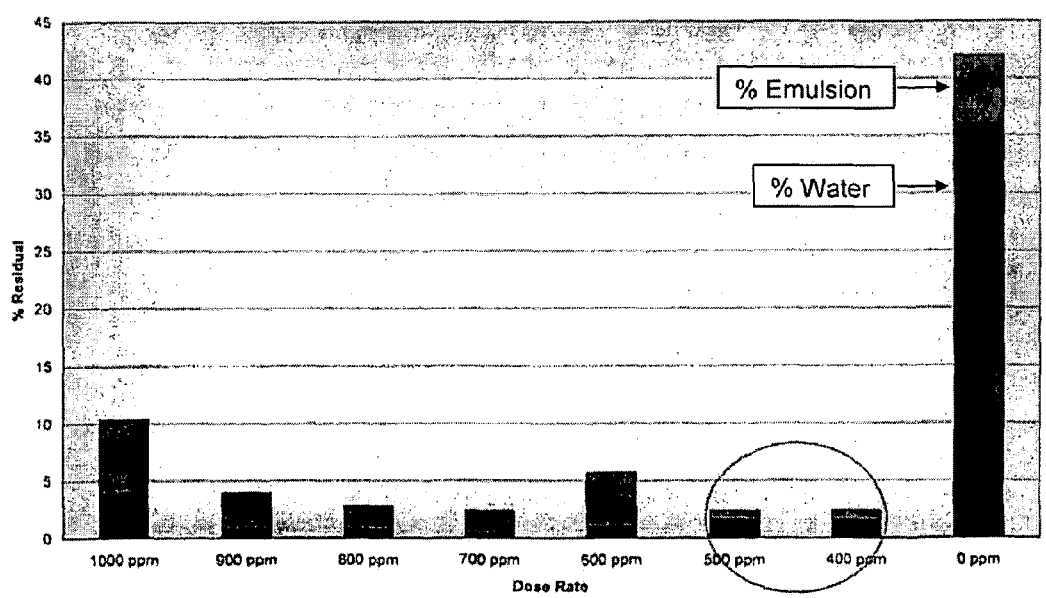
FIG. 17 is a graph of residual emulsion levels in sample B as a function of concentration of a composition (Formulation D) of the invention.

FIG. 16 shows images of the grind out results of sample B for each Formulation D concentration. The results are also presented quantitatively in FIG. 17 and Table 7. After 40 minutes, homogenised samples taken from the untreated oil layer still indicate 6% emulsion present, as opposed to 0.8% in the samples treated with 400 or 500 ppm of Formulation D.

TABLE 7

Centrifuge grind out results and pH of separated water from sample A:

| | | Tube | | | | | | | |
|---|---|---|---|---|---|---|---|---|---|
| | | 1 | 2 | 3 | 4 | 5 | 6 | 7 | 8 |
| pH of thieved H$_2$O | | 7.96 | 7.7 | 7.36 | 5.74 | 7.06 | 6.88 | 6.29 | 5.85 |
| Centrifuge grind out | % W | 36 | 1.6 | 1.6 | 1 | 0.4 | 0.8 | 0.8 | 4 |
| | % E | 6 | 0.8 | 0.8 | 4.7 | 2 | 2 | 3.2 | 6.4 |
| | % O | 58 | 97.6 | 97.6 | 94.3 | 97.6 | 97.2 | 96 | 89.6 |

W = water,
E = emulsion,
O = oil,
ppm = parts per million.

Signs of over treatment were observed with dosage rates above 500 ppm of Formulation D on sample B, presenting with higher residual emulsion content within the oil phase. For sample B, the optimum dose of Formulation D for achieving minimal residual emulsion levels was around 400 to 500 ppm (see FIG. 17 and Table 7).

The Formulation D composition maintained its excellent performance on sample B, achieving acceptable results at similar dosage rates as required for sample A. This suggests that Formulation D will be effective in handling production system upsets and/or periods of instability.

Example 4

The emulsion prevention characteristics of the compositions of the invention were further tested in conjunction with four aqueous phases to be used as completion fluids on an oil sample obtained from an oil field off the North West Malaysian coast. The oil was obtained from a drill seam test.

The following completion fluids were tested:
1. Actual Sea water (collected from Perth sea shore) with a pH of 7.7. The water was filtered through a Whatmann No. 1 filter paper using a sintered glass funnel.
2. 10.5 lb/gal CaCl$_2$ solution prepared in the laboratory by dissolving CaCl$_2$.2H$_2$O in deionised water
3. 12.5 lb/gal CaBr$_2$ solution, prepared by dissolving CaBr$_2$.H$_2$O.
4. 10.5 lb/gal KHCO$_3$ solution prepared by dissolving KHCO$_3$ in water (the dissolution was not complete and only supernatant liquid was used for the test purposes).

1. Actual Sea Water and Crude Oil

Set 1—Compositions Added After the Emulsion was Formed

Figure 18:
FIG. 18 is a photograph of untreated emulsions of sea water with crude oil.

An emulsion was prepared by mixing 50% sea water completion fluid and 50% crude oil at 10000 rpm for one minute. The resulting emulsion was then poured into 100 ml centrifuge tubes. FIG. 18 represents the stable and viscous emulsion formed when sea water was mixed with crude oil.

Figure 19:
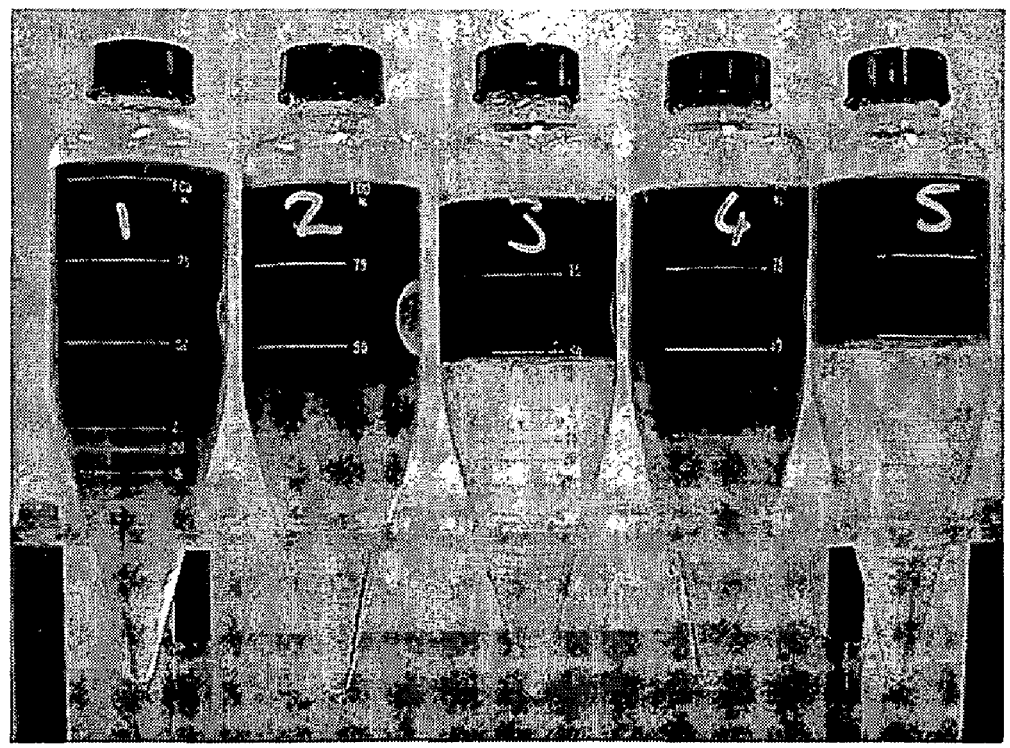
FIG. 19 is a photograph of the samples in FIG. 18 after treatment with two compositions (Formulation B and Formulation E) of the invention.

100 ppm of the compositions of the invention was injected at room temperature into each emulsion and the centrifuge tubes were then transferred to a water bath maintained at 65° C. Water separation was noted at intervals of 1 minute, 2 minutes, 5 minutes, 10 minutes, 20 minutes and 30 minutes. Centrifuge tubes were then removed from the water bath. FIG. 19 represents the samples after 30 minutes.

It was observed that Formulation B was able to resolve 100% emulsion within first 10 minutes. In fact, Formulation B very clearly separated the water from the oil without any emulsion pad. The interface is also sharp and clear. Another composition EBK 205 was able to resolve 95% of the emulsion within the stipulated test period.

Set 2—Compositions Added to the Sea Water Prior to Emulsion Formation

In a mixing vessel 50 ml quantities of sea water were treated with the compositions of the invention at the desired dose rate. The fluid was then stirred for 1 minute at 500 rpm to ensure complete mixing of the composition in the system. A 50 ml crude oil sample was added and the emulsion prepared by stirring the system at 10000 rpm for 1 minute. The contents were transferred into 100 ml centrifuge tubes.

Figure 20:
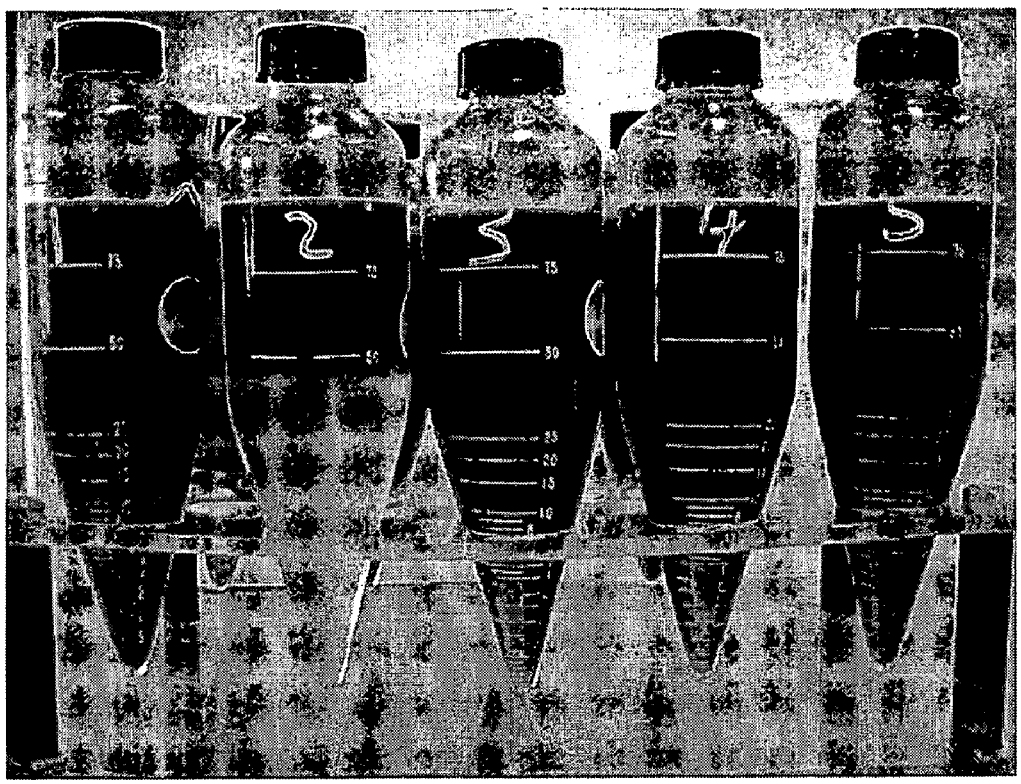
FIG. 20 is a photograph of the initial emulsions obtained from sea water with crude oil wherein the sea water was treated with two compositions (Formulation B and Formulation E) of the invention prior to mixing with crude oil.

FIG. 20 shows the initial emulsions are not stable and viscous. Instead the water separation appears to have begun. Indeed, almost complete water separation has already occurred in the centrifuge bottle containing Formulation B even before further treatment of the tubes in a water bath. This indicates that when added into the sea water phase prior to emulsion formation, Formulation B can prevent emulsion formation in the system.

Figure 21:
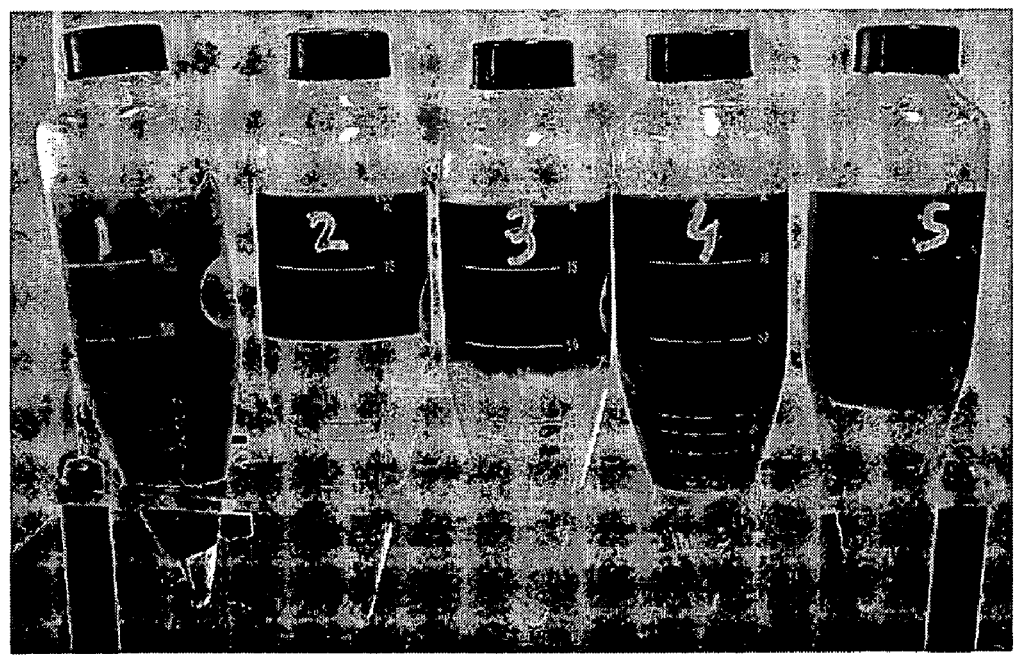
FIG. 21 is a photograph of the samples in FIG. 20 after thirty minutes at 65° C.

Centrifuge tubes containing the oil/water sample were then transferred to a water bath maintained at 65° C. Water separation was noted at intervals of 1 minute, 2 minutes, 5 minutes, 10 minutes, 20 minutes and 30 minutes. The tubes were then removed from the water bath. FIG. 21 represents the water separation data after 30 minutes at 65° C. Formulation B (tube no. 3) is extremely effective and produces clean water and a sharp interface. In contrast, Formulation E (tube no. 5) does not seem to be effective as it leaves behind significant untreated emulsion.

Based on these results only Formulation B and Formulation E were used for screening purposes in the remaining completion fluid systems below.

2. Calcium Chloride Solution (10.5 lb/gal) and Crude Oil

Figure 22:
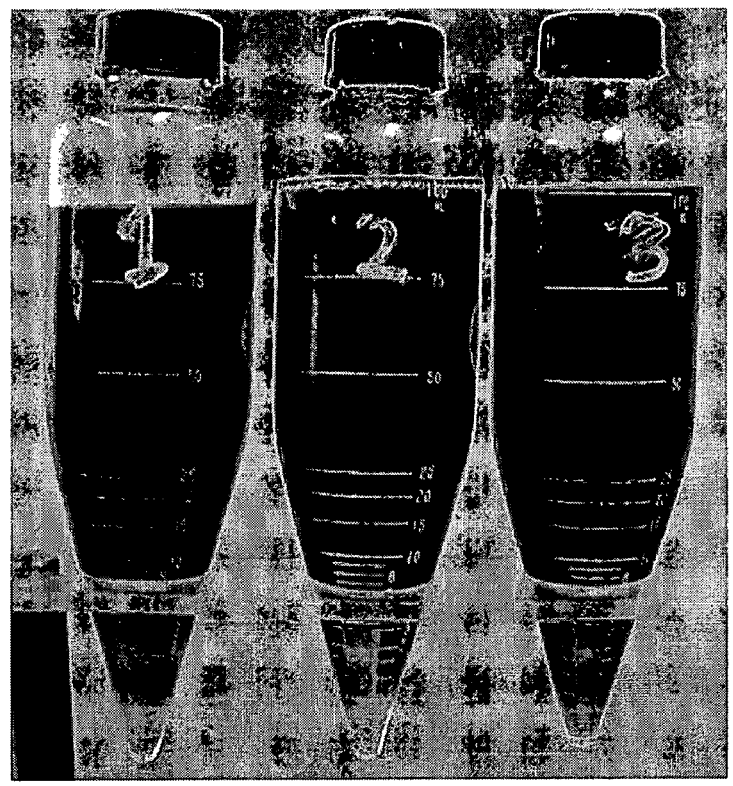
FIG. 22 is a photograph of untreated emulsions of calcium chloride solution with crude oil.
Figure 23:
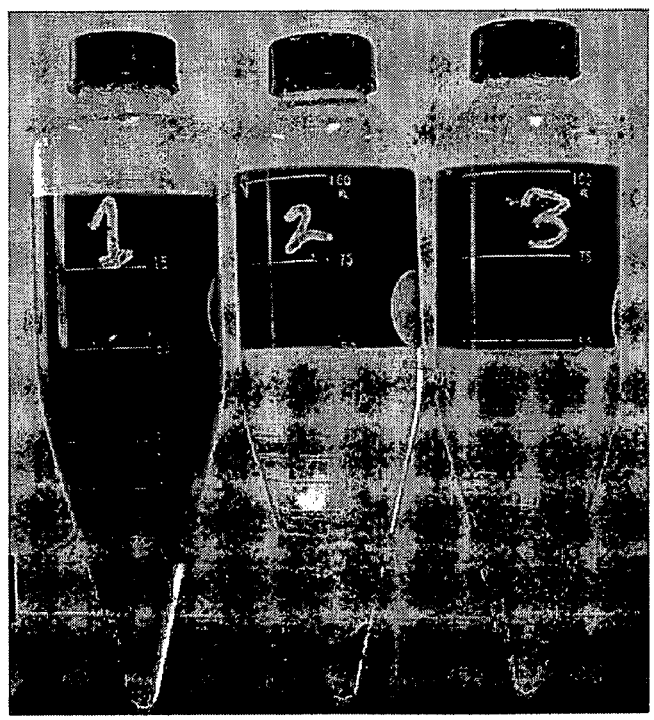
FIG. 23 is a photograph taken after five minutes and 65° C. of the samples in FIG. 22 after treatment with two compositions (Formulation B (middle) and Formulation E(right)) of the invention.

A weak and less stable emulsion formation was observed when the two phases were mixed together as represented in FIG. 22. Following the emulsification process, 100 ppm of Formulation B and Formulation E was injected in the centrifuge tube numbers 2 and 3 respectively. The bottles were transferred to a water bath maintained at 65° C. FIG. 23 indicates the extent of water separation after 5 minutes. In particular, complete emulsion separation was observed for Formulation B and Formulation E. However the separated water quality is better with Formulation B. Based on this result, only Formulation B was used for testing the remaining completion fluid systems.

3. Calcium Bromide Solution (12.5 lb/gal) and Crude Oil

Figure 24:
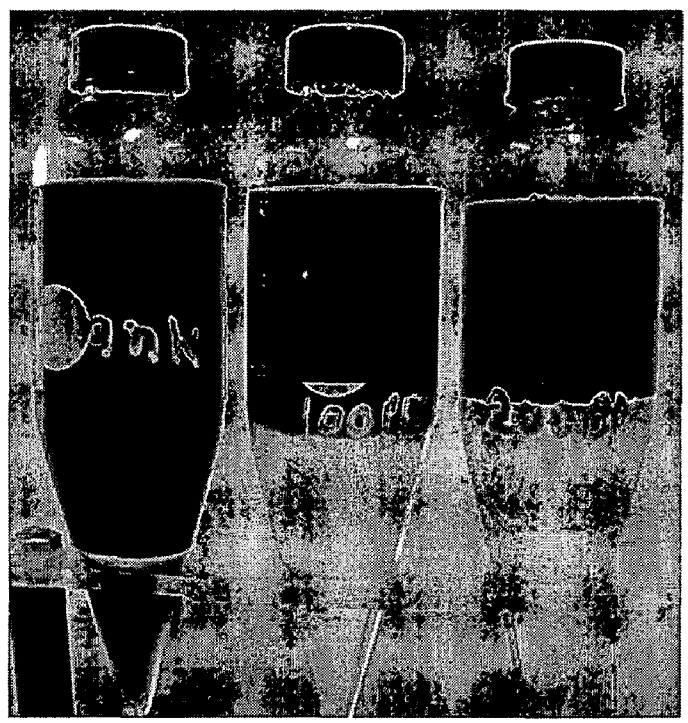
FIG. 24 is a photograph taken after thirty minutes at 65° C. of an untreated emulsion of calcium bromide solution with crude oil (left) and the emulsion wherein the calcium bromide solution was treated with 100 ppm (middle) and 200 ppm (right) of a composition (Formulation B) of the invention prior to emulsion formation.

In this example, composition Formulation B was injected into the calcium bromide solution prior to the emulsion formation with crude oil. FIG. 24 represents the water separation obtained at 65° C. after 30 minutes. Clearly, Formulation B is effective at resolving the emulsion. At 100 ppm the emulsion is not completely resolved. However, at 200 ppm the emulsion is completely resolved and the system has a very sharp interface with no emulsion pad.

4. Potassium Hydrogen Carbonate Solution (10.5 lb/gal) and Crude Oil

Set 1—Compositions Added After the Emulsion was Formed

Figure 25:
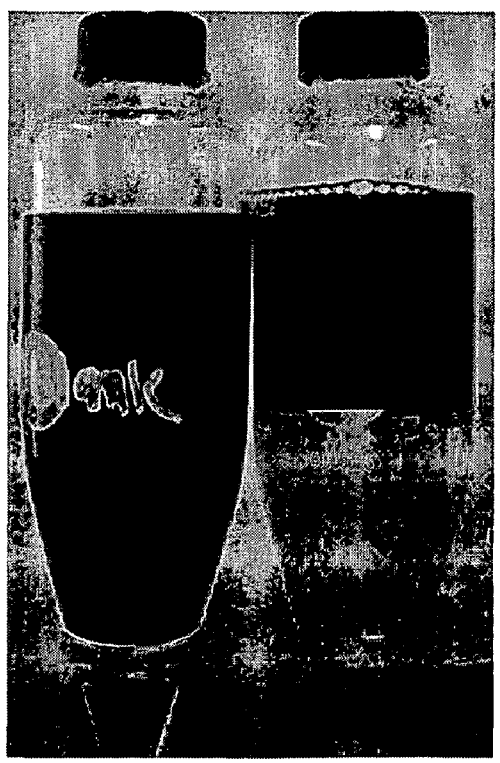
FIG. 25 is a photograph taken after thirty minutes at 65° C. of an untreated emulsion of potassium hydrogen carbonate solution with crude oil (left) and the emulsion after treatment with a composition (Formulation B) of the invention (right).

A 50:50 mixture of crude oil and potassium hydrogen carbonate solution was prepared by mixing crude oil and potassium hydrogen carbonate solution. The emulsion was separated into two tubes. Formulation B was then injected into one tube. The tubes were transferred to a water bath at 65° C. for 30 minutes. FIG. 25 indicates the water separation pattern for the blank (left) and the emulsion treated with Formulation B (right). Clearly, complete emulsion resolution takes place in the emulsion treated with Formulation B.

Set 2—Compositions Added to the Completion Fluid Prior to Emulsion Formation

Figure 26:
FIG. 26 is a photograph taken after thirty minutes at 65° C. of an untreated emulsion of potassium hydrogen carbonate solution with crude oil (left) and the emulsion wherein the potassium hydrogen carbonate solution was treated with a composition (Formulation B) of the invention prior to emulsion formation (right).

In this set Formulation B was injected in the potassium hydrogen carbonate solution prior to mixing the solution with crude oil. Upon heating the treated emulsion was resolved very quickly (within first 5 minutes) producing a clear interface. FIG. 26 shows the water separation for the blank (left) and the emulsion treated with Formulation B (right) after 30 minutes at 65° C.

Example 4 clearly indicates that Formulation B effectively treats the oil emulsion on all of the completion fluid systems at 100 ppm (0.01%) except for the calcium bromide system where the chemical is effective at 200 ppm (0.02%).

It will of course be realised that the above has been given only by way of illustrative example of the invention and that all such modifications and variations thereto as would be apparent to persons skilled in the art are deemed to fall within the broad scope and ambit of the invention as herein set forth.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A composition for mitigating or preventing the formation of an emulsion between naphthenic acid and metal cations in a hydrocarbon body, the composition comprising at least one alkoxylated amine, at least one acid, and at least one alcohol, wherein the at least one acid is present in the amount between about 30 to 80%, and wherein the at least one alcohol is present in the amount between about 10 to 60%.

2. The composition of claim 1, wherein the at least one alkoxylated amine has the formula:

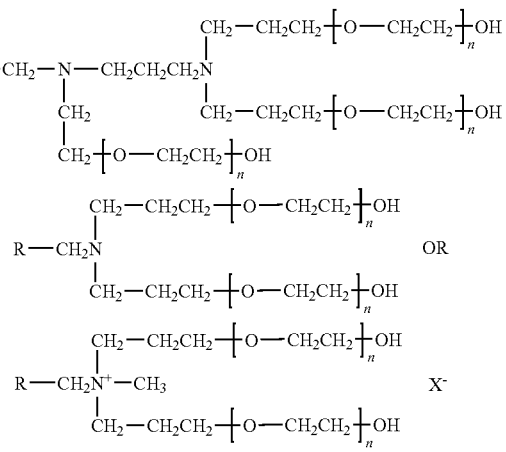

where R represents an alkyl chain having between one and ten carbon atoms, X represents a halogen, nitrate or acetate group and n is any integer between 1 and 8.

3. The composition of claim 1, wherein the at least one alkoxylated amine is selected from the group consisting of an alkyldiamine ethoxylate, a tallowalkylamine ethoxylate propoxylate, and combinations thereof.

4. The composition of claim 1, wherein the alkoxylated amine comprises a mixture of alkoxylated fatty amines with carbon chain length from $C_{10}$-$C_{24}$ and fatty amines with carbon chain length between $C_{12}$-$C_{24}$.

5. The composition of claim 1, wherein the alkoxylated amine comprises a quaternary amine of the formula:

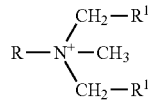

where $R^1$ is $(CH_2CH_2O)_nH$ and R is a saturated or unsaturated alkyl chain with carbon numbers varying from $C_{10}$-$C_{16}$ and having an average number of ethoxylate units of from 10 to 20.

6. The composition of claim 1, further comprising at least two alkoxylated amines.

7. The composition of claim 1, wherein the at least one alkoxylated amine is present in the amount of up to about 5% w/w.

8. The composition of claim 1, wherein the at least one acid is selected from the group consisting of sulphuric acid hydrochloric acid, phosphoric acid, glacial acetic acid, propanoic acid, benzoic acid, benzene sulphonic acid, dodecyl benzene sulphonic acid and isopropylamine dodecyl benzene sulphonic acid.

9. The composition of claim 1, wherein the at least one alcohol is selected from the group consisting of methanol, ethanol, propanol, isopropanol, butanol and 2-butoxyethanol.

10. The composition of claim 1. further including at least one demulsifier selected from the group consisting of an alkylene oxide block polymer demulsifier with a relative solubility in the range of from 5 to 7, an alkyl phenol/formaldehyde resin ethoxylate demulsifier with a relative solubility in the range of from 7 to 9, and a mixture of triol ester and tetrol demulsifier with a relative solubility in the range of from 5 to 7.

11. A method for mitigating or preventing the formation of an emulsion between naphthenic acid and metal cations in a hydrocarbon body, wherein the method comprises contacting a composition comprising at least one alkoxylated amine, at least one acid, and at least one alcohol with the hydrocarbon body, wherein the at least one acid is present in the amount between about 30 to 80%, and wherein the at least one alcohol is present in the amount between about 10 to 60%.

12. The method of claim 11, wherein the metal cation is selected from the group consisting of sodium, potassium, calcium, magnesium or a mixture thereof.

13. The method of claim 11, wherein the emulsion comprises a sodium carboxylate emulsion.

14. The method of claim 11, wherein the composition further comprises an acid or an alcohol or a mixture thereof.

15. The method of claim 11, wherein the method further comprises dissolving the composition in an aqueous solution prior to contact with the hydrocarbon body.

16. The method of claim 11, wherein the method further comprises contacting the composition with the hydrocarbon body simultaneously with or after deprotonation of the naphthenic acid.

17. The method of claim 11, wherein the method further comprises contacting the composition with the hydrocarbon body at a temperature between about 40 and 85° C.

18. The method of claim 11, wherein the at least one alkoxylated amine comprises a mixture of alkoxylated fatty amines with carbon chain length from $C_{10}$-$C_{24}$ and fatty amines with carbon chain length between $C_{12}$-$C_{24}$.

19. The method of claim 11, wherein the at least one alkoxylated amine comprises a quaternary amine of the formula:

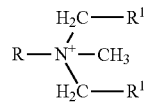

where $R^1$ is $(CH_2CH_2O)_nH$ and R is a saturated or unsaturated alkyl chain with carbon numbers varying from C10-C16 and having an average number of ethoxylate units of from 10 to 20.

20. The method of claim 11, wherein the composition further includes at least one demulsifier selected from the group consisting of an alkylene oxide block polymer demulsifier with a relative solubility in the range of from 5 to 7, an alkyl phenol/formaldehyde resin ethoxylate demulsifier with a relative solubility in the range of from 7 to 9, and a mixture of triol ester and tetrol demulsifier with a relative solubility in the range of from 5 to 7.

21. A method for completing an oil well comprising pumping a completion fluid into the oil well, wherein the completion fluid comprises water, at least one alkoxylated amine, at least one acid, and at least one alcohol, wherein the at least one acid is present in the amount between about 30 to 80%. and wherein the at least one alcohol is present in the amount between about 10 to 60%.

\* \* \* \* \*